United States Patent
Hoel et al.

(10) Patent No.: US 10,508,809 B2
(45) Date of Patent: Dec. 17, 2019

(54) ARTICLES FOR HIGH TEMPERATURE SERVICE AND METHODS FOR MAKING

(71) Applicant: General Electric Company, Schenectady, NY (US)

(72) Inventors: Cathleen Ann Hoel, Schenectady, NY (US); Kristen Hall Brosnan, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 232 days.

(21) Appl. No.: 15/338,979

(22) Filed: Oct. 31, 2016

(65) Prior Publication Data
US 2018/0119270 A1    May 3, 2018

(51) Int. Cl.
| | | |
|---|---|---|
| *C23C 14/08* | (2006.01) | |
| *F23R 3/00* | (2006.01) | |
| *C23C 4/134* | (2016.01) | |
| *C23C 4/11* | (2016.01) | |
| *F01D 5/28* | (2006.01) | |

(52) U.S. Cl.
CPC ............... *F23R 3/002* (2013.01); *C23C 4/11* (2016.01); *C23C 4/134* (2016.01); *F01D 5/288* (2013.01); *F05D 2230/312* (2013.01); *F05D 2230/313* (2013.01); *F05D 2300/2112* (2013.01); *F05D 2300/5023* (2013.01)

(58) Field of Classification Search
CPC ........ C23C 14/081; C23C 16/56; B05D 3/007
See application file for complete search history.

(56) References Cited

U.S. PATENT DOCUMENTS

| | | |
|---|---|---|
| 5,871,820 A | 2/1999 | Hasz et al. |
| 6,296,945 B1 * | 10/2001 | Subramanian ...... C23C 28/3215 428/469 |
| 7,008,674 B2 | 3/2006 | Nagaraj et al. |
| 8,356,482 B2 | 1/2013 | Duval et al. |
| 2004/0170849 A1 | 9/2004 | Ackerman et al. |

(Continued)

FOREIGN PATENT DOCUMENTS

WO    2014035413 A1    3/2014

OTHER PUBLICATIONS

Kulkarni et al "Advanced neutron and X-ray techniques for insights into the microstructure of EB-PVD thermal barrier coatings" Mat. Sci and Eng A 426 (2006) 43-52. (Year: 2006).*

(Continued)

*Primary Examiner* — Nathan H Empie
(74) *Attorney, Agent, or Firm* — Dority & Manning, P.A.

(57) ABSTRACT

Embodiments of the present disclosure are directed to an article and methods of forming the article. The article includes a thermal barrier coating disposed on a substrate. The thermal barrier coating includes a thermal barrier material and partially filled surface-connected columnar voids. The partially filled surface-connected columnar voids are interspersed with the thermal barrier material in the thermal barrier coating. At least some of the partially filled surface-connected columnar voids include a calcium-magnesium-aluminum-silicon-oxide (CMAS)-reactive material disposed within, such that the CMAS-reactive material is physically separated from the substrate by a columnar cavity having an aspect ratio greater than 3.

12 Claims, 3 Drawing Sheets

(56) References Cited

U.S. PATENT DOCUMENTS

| | | | |
|---|---|---|---|
| 2007/0119713 A1* | 5/2007 | Hasz | C25D 7/10 |
| | | | 204/490 |
| 2009/0142578 A1* | 6/2009 | Riman | C04B 35/2658 |
| | | | 428/319.1 |
| 2014/0065408 A1 | 3/2014 | Strock et al. | |
| 2015/0147562 A1 | 5/2015 | Sambasivan et al. | |
| 2016/0362775 A1* | 12/2016 | Read | F01D 25/002 |

OTHER PUBLICATIONS

Mercer et al., "A delamination mechanism for thermal barrier coatings subject to calcium-magnesium-alumino-silicate (CMAS) infiltration", Acta Materialia, vol. 53, Issue: 4, Feb. 2005, pp. 1029-1039.

Naraparaju et al., "The Accelerating Effect of CaSO4 Within CMAS (CaO—MgO—Al2O3—SiO2) and Its Effect on the nfiltration Behavior in EB-PVD 7YSZ", Journal of the American Ceramic Society, vol. 99, Issue: 4, Apr. 2016, pp. 1398-1403.

* cited by examiner

ARTICLES FOR HIGH TEMPERATURE SERVICE AND METHODS FOR MAKING

BACKGROUND

The invention relates generally to articles comprising thermal barrier coatings. More particularly, the invention relates to articles comprising thermal barrier coatings having a thermal barrier material and a calcium-magnesium-aluminum-silicon-oxide (CMAS)-reactive material.

Thermal barrier coatings are typically used in articles that are exposed to high temperatures. Aviation turbines and land-based turbines, for example, may include one or more components protected by the thermal barrier coatings. Under normal conditions of operation, thermal-barrier coated components may be susceptible to various types of damage, including erosion, oxidation, and attack from environmental contaminants.

For turbine components, environmental contaminant compositions of particular concern are those containing oxides of calcium, magnesium, aluminum, silicon, and mixtures thereof. These oxides combine to form contaminant compositions comprising mixed calcium-magnesium-aluminum-silicon-oxide systems (Ca—Mg—Al—SiO), hereafter referred to as "CMAS." At the high turbine operating temperatures, these environmental contaminants can adhere to the heated or hot thermal barrier coating surface, and thus cause damage to the thermal barrier coating. For example, CMAS can form compositions that are liquid or molten at the operating temperatures of the turbines. The molten CMAS composition can dissolve the thermal barrier coating, or can infiltrate its porous structure by infiltrating the pores, channels or cavities in the coating. Upon cooling, the infiltrated CMAS composition solidifies and reduces the coating strain tolerance, thus initiating and propagating cracks that may cause delamination and spalling of the coating material. This may further result in partial or complete loss of the thermal protection provided to the underlying metal substrate of the part or component. Further, spallation of the thermal barrier coating may create hot spots in the metal substrate leading to premature component failure. Premature component failure can lead to unscheduled maintenance as well as parts replacement resulting in reduced performance, and increased operating and servicing costs.

Earlier attempts at protecting the underlying metal substrate included pre-infiltrating some CMAS-reactive phases into the porous structure of the thermal barrier coating, reacting it with CMAS and solidifying the reaction product to form a barrier which prevents further CMAS infiltration in to the thermal barrier coating. However, the presence of the reaction product formed by reacting CMAS-reactive phases with CMAS in the pores of the thermal barrier coating may reduce the life and efficiency of the thermal barrier coating. Thus, a need exists for improved method and design of thermal barrier coatings to enhance efficiency of thermal barrier coatings in adverse environmental conditions without compromising the efficacy of the thermal barrier coating.

BRIEF DESCRIPTION

Embodiments of the present disclosure are provided to meet this and other needs. One embodiment is directed to an article comprising a thermal barrier coating disposed on a substrate. The thermal barrier coating comprises a thermal barrier material and has partially filled surface-connected columnar voids interspersed within the thermal barrier material. At least some of the partially filled surface-connected columnar voids include a calcium-magnesium-aluminum-silicon-oxide (CMAS)-reactive material disposed within, such that the CMAS-reactive material is physically separated from the substrate by a columnar cavity having an aspect ratio greater than 3.

Another embodiment of the disclosure is directed to a method of forming an article. The method includes disposing a calcium-magnesium-aluminum-silicon-oxide (CMAS)-reactive material within at least some surface-connected columnar voids in a thermal barrier coating disposed on a substrate such that the CMAS-reactive material is physically separated from the substrate by a columnar cavity having an aspect ratio greater than 3.

Another embodiment of the disclosure is directed to a method. The method comprises disposing a fugitive material within at least some surface-connected columnar voids in a thermal barrier coating, disposing a calcium-magnesium-aluminum-silicon-oxide (CMAS)-reactive material over the fugitive material, and removing the fugitive material to create a columnar cavity in the thermal barrier coating in between the CMAS-reactive material and the substrate.

DRAWINGS

These and other features, aspects, and advantages of the present disclosure will become better understood when the following detailed description is read with reference to the accompanying drawings in which like characters represent like parts.

DETAILED DESCRIPTION

Figure 1:
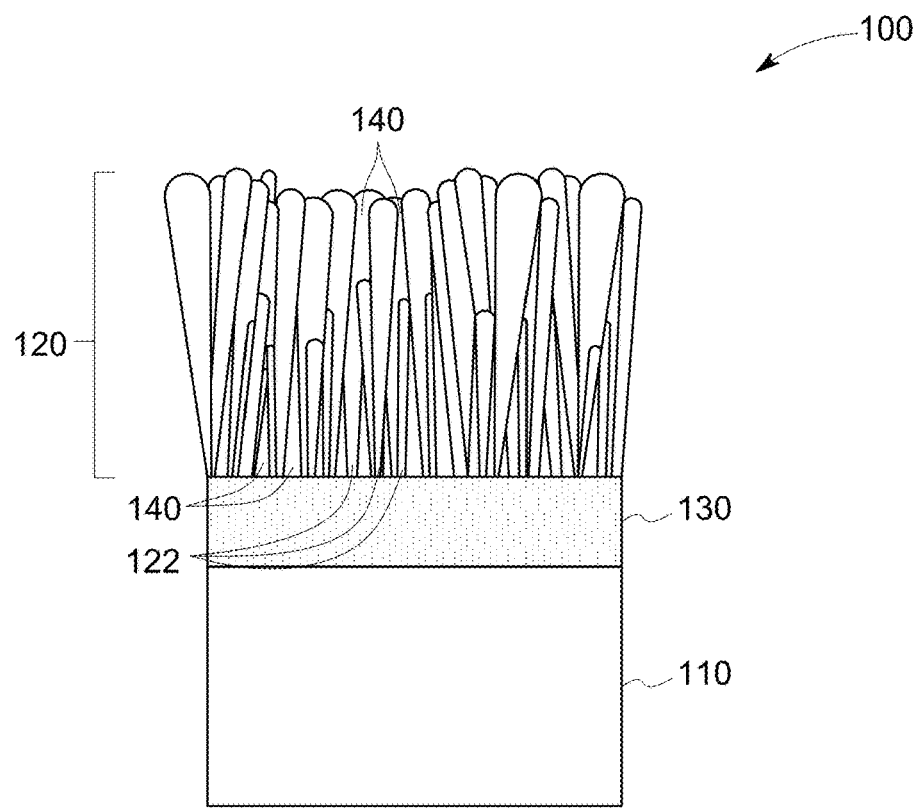
FIG. 1 illustrates a schematic cross-section of an article including thermal barrier coatings.

Approximating language, as used herein throughout the specification and claims, may be applied to modify any quantitative representation that could permissibly vary without resulting in a change in the basic function to which it is related. Accordingly, a value modified by a term or terms, such as "about", and "substantially" is not to be limited to the precise value specified. In some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

To more clearly and concisely describe and point out the subject matter, the following definitions are provided for specific terms, which are used throughout the following description and the appended claims, unless specifically denoted otherwise with respect to particular embodiments.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while considering that in some circumstances, the modified term may sometimes not be appropriate, capable, or suitable.

As used herein, the term "thermal barrier coating" refers to a coating that includes a material capable of reducing heat flow to the underlying substrate of the article, that is, to form a thermal barrier. As used herein, the term "coating" refers to a material disposed on at least a portion of an underlying surface in a continuous or discontinuous manner. Further, the term "surface" does not necessarily mean an even surface, and the term "coating" does not necessarily mean a uniform thickness of the disposed material, and the disposed material may have a uniform or a variable thickness. The term "coating" may refer to a single layer of the coating material or may refer to a plurality of layers of the coating material. The coating material may be the same or different in the plurality of layers.

As used herein, the term "disposed on" refers to layers or coatings disposed directly in contact with each other or indirectly by having intervening layers there between, unless otherwise specifically indicated. The term "depositing" refers to a method of laying down material in contact with an underlying or adjacent surface in a continuous or discontinuous manner. The term "adjacent" as used herein means that the two materials or coatings are disposed contiguously and are in direct contact with each other.

As used herein, the term "surface-connected columnar voids" refers to columnar voids that are open to the surface facing the environmental contaminants. In some embodiments, a columnar void has an aspect ratio higher than 1. The term "partially filled surface-connected columnar voids" refers to a columnar region formed by a partial filling of the CMAS-reactive material in the surface-connected columnar voids used herein. In some embodiments, the partially filled surface-connected columnar voids are formed by filling the surface-connected portion of the surface-connected columnar voids by the CMAS-reactive materials. Thus, in some embodiments, the partially filled surface-connected columnar voids have the CMAS-reactive materials connected to the surface that faces the environmental contaminants. The partially filled surface-connected columnar void may be a single column or a combination of a plurality of columns, wherein the columns are interconnected and eventually connected to the surface. The term "columnar cavity" refers a columnar void formed by the partial filling of the CMAS-reactive material in the surface-connected columnar voids used herein. The columnar cavity is disposed in between the substrate and the CMAS-reactive material in the partially filled surface-connected columnar voids.

As used herein an "aspect ratio" is the ratio between height and width (height/width), wherein the width is measured at half point of the height. A surface-connected columnar void may be a single columnar void or a combination of a plurality of columnar voids or cracks, wherein the columns are interconnected (e.g. by sideways or diagonal channels) and eventually connected to the surface through one or more openings to the surface.

The "surface" as used herein in the context of "partially filled surface-connected columnar voids" and "surface-connected columnar voids" is the top surface of the referred layer. For example, a surface-connected columnar void of a thermal barrier coating is the pore that is open to the top surface of the thermal barrier coating. Surface-connected columnar voids are the voids such as cracks, pores, and the like often oriented such that molten CMAS typically infiltrate the coating in the cross-sectional thickness to a region proximate to the substrate. In some embodiments, the surface-connected columnar void is vertical with respect to the substrate on which the coating is present.

As mentioned earlier, thermal barrier coatings are susceptible to degradation caused by molten CMAS compositions at high turbine operating temperatures. The molten CMAS composition can dissolve the thermal barrier coating, or can infiltrate a porous structure of the thermal barrier coating by infiltrating the pores, channels or other cavities present in the coating. Upon cooling, the infiltrated CMAS composition solidifies and reduces the coating strain tolerance, thus initiating and propagating cracks that may cause delamination and spallation of the coating material. Previous methods to protect the thermal barrier coatings include use of CMAS-reactive compositions. However, the amount and positioning of the CMAS-reactive materials in thermal barrier coatings, and the consequent impact of the amount and positioning of the CMAS-reactive materials in thermal barrier coatings on the longevity of the thermal barrier coating has not been studied in sufficient detail.

Embodiments of the disclosure described herein address the noted shortcomings of the state of the art. Some embodiments present an article having a thermal barrier coating (TBC). The TBC includes a thermal barrier material and partially filled surface-connected columnar voids. The partially filled surface-connected columnar voids are interspersed within the thermal barrier material in the thermal barrier coating. At least some of the partially filled surface-connected columnar voids include a calcium-magnesium-aluminum-silicon-oxide (CMAS)-reactive material disposed within, such that the CMAS-reactive material is physically separated from the substrate by a columnar cavity having an aspect ratio greater than 3.

In some embodiments, the TBC includes a thermal barrier material having a melting point greater than about 1090° C. In some embodiments, the TBC includes a thermal barrier material having a melting point greater than about 1200° C. In some embodiments, the TBC includes a thermal barrier material having a melting point in a range from about 1200° C. to about 1930° C.

In some embodiments, the TBC includes a ceramic thermal barrier material. Suitable ceramic thermal barrier materials include various zirconias, particularly chemically stabilized zirconias (for example, metal oxides blended with zirconia), such as yttria-stabilized zirconias, ceria-stabilized zirconias, calcia-stabilized zirconias, scandia-stabilized zirconias, magnesia-stabilized zirconias, india-stabilized zirconias, ytterbia-stabilized zirconias, lanthana-stabilized zirconias, gadolinia-stabilized zirconias, as well as mixtures of such stabilized zirconias.

In certain embodiments, the TBC includes yttria-stabilized zirconias. Suitable yttria-stabilized zirconias may include from about 1 wt % to about 20 wt % yttria (based on the combined weight of yttria and zirconia), and more typically from about 3 wt % to about 10 wt % yttria. An example yttria-stabilized zirconia TBC includes about 7 wt % yttria and about 93 wt % zirconia. These chemically stabilized zirconias may further include one or more of a second metal (e.g., a lanthanide or actinide) oxide such as dysprosia, erbia, europia, gadolinia, neodymia, praseodymia, urania, and hafnia to further reduce thermal conductivity of the thermal barrier coating. In some embodiments, the thermal barrier material may further include an additional metal oxide, such as, titania.

In some embodiments, suitable ceramic thermal barrier materials may include pyrochlores of general formula $A_2B_2O_7$ where A is a metal having a valence of $3^+$ or $2^+$ (e.g., gadolinium, aluminum, cerium, lanthanum or yttrium) and B is a metal having a valence of $4^+$ or $5^+$ (e.g., hafnium, titanium, cerium or zirconium) where the sum of the A and B valences is 7. Representative materials of this type include gadolinium zirconate, lanthanum titanate, lanthanum zirconate, yttrium zirconate, lanthanum hafnate, cerium zirconate, aluminum cerate, cerium hafnate, aluminum hafnate, and lanthanum cerate.

The composition of the thermal barrier material may depend upon one or more factors, including the composition of the adjacent bond coat layer (if present), the coefficient of thermal expansion (CTE) characteristics desired for the TBC, and the thermal barrier properties desired for the TBC.

The thickness of the TBC may depend upon the substrate or the component it is deposited on. In some embodiments, the TBC has a thickness in a range from about 25 microns to about 2000 microns. In some embodiments, the TBC has a thickness in a range of from about 25 microns to about 1500 microns. In some embodiments, the TBC has a thickness in a range of from about 25 microns to about 1000 microns.

The article may further include a bond coat disposed between the substrate and the TBC. The bond coat may be formed from a metallic oxidation-resistant material that protects the underlying substrate and enables the TBC to more tenaciously adhere to substrate. Suitable materials for the bond coat include $M_1CrAlY$ alloy powders, where $M_1$ represents a metal such as iron, nickel, platinum or cobalt. Non-limiting examples of suitable bond coat materials include metal aluminides such as nickel aluminide, platinum aluminide, or combinations thereof. The bond coat may have a thickness in the range from about 25 microns to about 500 microns.

TBC may be disposed over the afore-mentioned bond coat or directly onto the substrate depending upon the desired application. The type of substrate may depend on the turbine component. Non-limiting examples of suitable substrates include metals, metal alloys, or combinations thereof. In certain embodiments, the substrate includes an alloy of nickel, cobalt, iron, or combinations thereof. For example, the substrate may include a high temperature, heat-resistant alloy, e.g., a superalloy. Non-limiting examples of suitable high temperature nickel-based alloys include Inconel®, Nimonic®, Rene® (e.g., Rene® 80, Rene® 95 alloys), Udimet®, or combinations thereof.

Some embodiments of the present disclosure are directed to an article wherein the TBC is disposed on the substrate or on the bond coat. The TBC comprises a thermal barrier material and partially filled surface-connected columnar voids. The partially filled surface-connected columnar voids have CMAS-reactive material disposed therein such that the CMAS-reactive material is physically separated from the substrate by a columnar cavity. In accordance with some embodiments of the disclosure, the CMAS-reactive material protects the TBC by undergoing one or both of chemical and physical changes when in contact with a CMAS composition.

The term "CMAS" or "CMAS composition" as used herein refers to a contaminant composition comprising calcium, magnesium, aluminum and silicon. In some embodiments, the CMAS composition primarily comprises a mixture of magnesium oxide, calcium oxide, aluminum oxide and silicon oxide. Non-limiting example of a suitable CMAS composition includes calcium oxide present in an amount in a range from about 1 wt % to about 60 wt % of the total CMAS composition; magnesium oxide present in an amount in a range from about 0 wt % to about 20 wt % of the total CMAS composition; aluminum oxide present in an amount in a range from about 10 wt % to about 30 wt % of the total CMAS composition; and silicon oxide present in an amount in a range from about 20 wt % to about 80 wt % of the total CMAS composition.

In some embodiments, other elements, such as nickel, iron, titanium and chromium, may also be present in the CMAS composition. In such instances, the additional elements may be present in a small amount, for example, less than about 10 weight percent of total amount of CMAS composition present. In some such instances, the CMAS composition may include about 29 wt % calcium oxide, about 7 wt % magnesium oxide, about 11 wt % aluminum oxide, and about 43 wt % silicon oxide. Further, the composition may include about 2 wt % nickel oxide, about 8 wt % iron oxide, and small amounts of titanium oxide and chromium oxide, such that the total weight % of these elements is less than 10 wt %. The CMAS composition may have a melting temperature less than about 1315° C. (2399° F.) in some embodiments, and less than about 1227° C. (2240° F.) in some other embodiments.

The particular compositional characteristics of the CMAS composition may depend on the source of the environmental contaminants and the reaction temperature. The CMAS composition is typically formed at operational temperatures of about 1000° C. (1832° F.) or more. Sources of CMAS composition include, but are not limited to, sand, dirt, volcanic ash, fly ash, cement, runway dirt, fuel and air sources, oxidation and wear products from engine components, or combinations thereof.

As used herein, the term "CMAS-reactive material" refers to a material capable of reacting with a CMAS composition to form a reaction product having one or both of melting temperature and viscosity greater than that of the CMAS composition. In some instances, the reaction product may form a glassy (typically thin) protective product that the CMAS deposits are either unable to adhere to, or are less able to adhere to.

As noted earlier, the TBCs typically include pores, channels, voids, or other cavities that may be infiltrated by molten environmental contaminants, such as, CMAS. Without being bound by any theory it is believed that the porous structure within the TBC may be one of the factors that provides for strain tolerance by the TBCs during thermal cycling. Further, the porous structure may additionally provide for stress reduction due to the differences between the coefficient of thermal expansion (CTE) of the coating and the CTE of the underlying bond coat layer/substrate.

In some instances, the surface-connected columnar voids of the TBC may be the pores, channels, voids, or other cavities that were created by environmental damage, normal wear and tear during operation of the thermal barrier coatings. In some instances, the pores, channels, voids, or cavities in the TBC surface may result due to the deposition processes. For example, TBCs that are deposited by (air) plasma spray techniques may result in a sponge-like porous structure of open pores in at least the surface of the coating. Similarly, TBCs that are deposited by physical vapor deposition techniques, such as, for example, electron beam physical vapor deposition (EBPVD) may result in a porous structure including a series of columnar grooves, crevices or channels in at least the surface of the coating.

In some embodiments, a porosity of the surface of the TBC is in a range from about 1 volume % to about 40 volume % of the surface, regardless of the depth of the surface-connected columnar voids present in the thermal barrier coating. In some embodiments, a TBC surface has a porosity in a range from about 10 volume % to about 30 volume % of the surface.

In some embodiments, the thermal barrier coating is disposed by electron-beam physical vapor deposition (EBPVD) method or suspension plasma spraying (SPS) method. TBCs formed by these methods typically have the surface-connected columnar voids. These columnar voids are elongated in shape and are often oriented such that contaminants entering the void can be conducted into the cross-sectional thickness of the TBC. In some embodiments, surface-connected columnar voids include substantially vertically oriented (from the perspective of a cross-sectional view) cracks, grain boundaries, or other microstructural features. In some embodiments, a CMAS-reactive material described herein is disposed within at least some voids of the plurality of the elongated substantially vertically oriented surface-connected voids.

FIG. 1 illustrates an article 100 deposited by EBPVD or SPS method. Article 100 includes a TBC 120 disposed on a substrate 110 with optional bond coat 130 disposed between the TBC 120 and the substrate 110. The TBC 120 includes a thermal barrier material 122 and surface-connected columnar voids 140 that allow access for environmental contaminants such as CMAS to the interior of TBC 120.

Certain embodiments of the present disclosure include TBCs having surface-connected columnar voids that incorporate the CMAS-reactive material such that the CMAS-reactive material is disposed within a plurality of the partially filled surface-connected columnar voids. The CMAS-reactive material disposed within a plurality of the surface-connected columnar voids preferentially reacts with molten CMAS that typically infiltrates the TBC and ultimately degrades it, as described previously. In some embodiments, the CMAS-reactive material may be disposed within the plurality of surface-connected columnar voids of the TBC and also, optionally, as a protective overlaying coating disposed on the thermal barrier coating.

Figure 2:
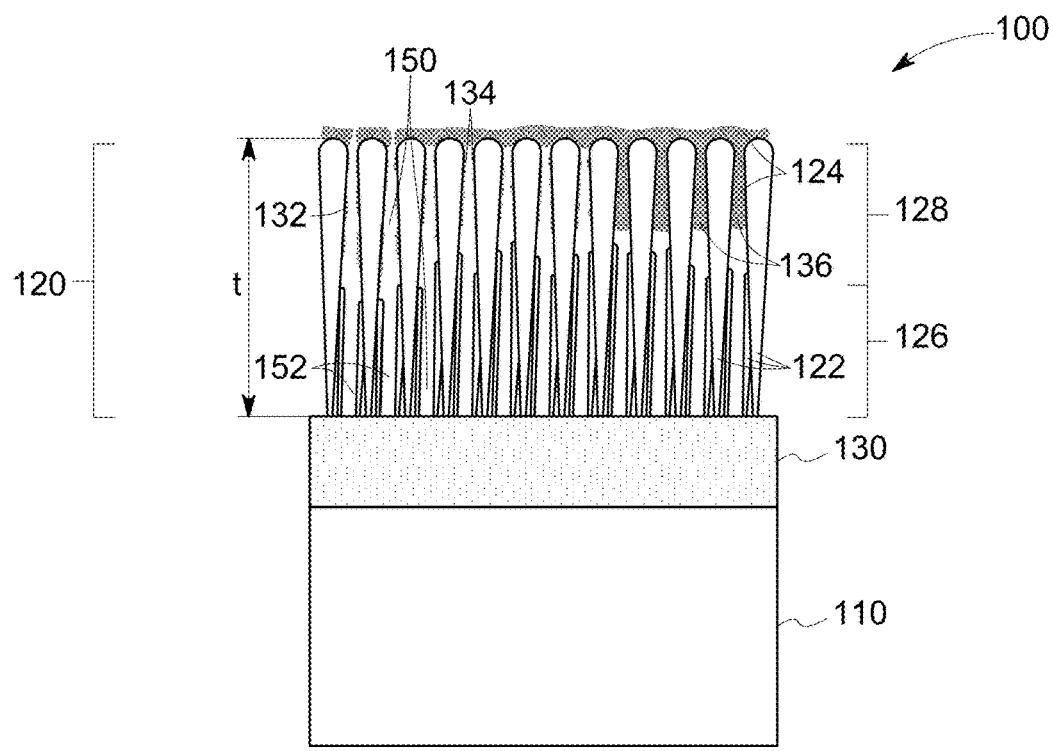
FIG. 2 is a schematic cross-section illustrating some embodiments of the present disclosure.

FIG. 2 illustrates an article 100, in accordance with different embodiments of the present disclosure. Article 100 includes the TBC 120 disposed on the substrate 110, optional bond coat 130 disposed between the TBC 120 and the substrate 110. The TBC 120 includes the thermal barrier material 122. The TBC further includes partially filled surface-connected columnar voids 150, where the surface-connected columnar voids 140 presented in FIG. 1 are partially filled with CMAS reactive material as described herein. In these embodiments, a CMAS-reactive material 124 is disposed within at least some of the surface-connected columnar voids 140 of the TBC 120 so that the article comprises partially filled surface connected columnar voids 150. FIG. 2 provides a schematic, magnified view of the thermal barrier coating as compared to that presented in FIG. 1 to clearly illustrate the partially filled surface-connected columnar voids 150.

The partially filled surface-connected columnar void 150 is a narrow region interspersed in between the thermal barrier material 122 of the TBC 120. In some embodiments, the "height" of the partially filled surface-connected columnar void 150 is measured along the cross-sectional thickness "t" (FIG. 2) of the TBC 120 and the width is measured in a direction parallel to the substrate 110. In some embodiments, the partially filled surface-connected columnar void 150 has an aspect ratio greater than 5. In some embodiments, the partially filled surface-connected columnar void 150 has an aspect ratio greater than 50. In some embodiments, the partially filled surface-connected columnar void 150 has an aspect ratio greater than 100.

At least some of the partially filled surface-connected columnar voids 150 include columnar cavities 152 physically separating the CMAS-reactive material 124 from the substrate 110 or from the optional bond coat 130. In some embodiments, greater than 80% (by number) of partially filled surface-connected columnar voids 150 include columnar cavities 152 physically separating the CMAS-reactive material 124 from the substrate 110 or from the optional bond coat 130. In some embodiments, substantially all the partially filled surface-connected columnar voids 150 include columnar cavities 152 physically separating the CMAS-reactive material 124 from the substrate 110 or the optional bond coat 130.

In some embodiments, the CMAS-reactive material 124 present in the partially filled surface-connected columnar void 150 has an aspect ratio greater than 5. In some embodiments, the CMAS-reactive material 124 present in the partially filled surface-connected columnar void 150 has an aspect ratio greater than 30. In some embodiments, the CMAS-reactive material 124 present in the partially filled surface-connected columnar void 150 has an aspect ratio greater than 50.

In some embodiments, the columnar cavity 152 present in the partially filled surface-connected columnar void 150 has an aspect ratio greater than 5. In some embodiments, the columnar cavity 152 present in the partially filled surface-connected columnar void 150 has an aspect ratio greater than 30. In some embodiments, the columnar cavity 152 present in the partially filled surface-connected columnar void 150 has an aspect ratio greater than 50.

In certain embodiments, the CMAS-reactive material 124 is further disposed on the top of the thermal barrier material 122, as shown in FIG. 2. The CMAS-reactive material 124 that is disposed on the top of the thermal barrier material 122 may be a continuous layer, or may have pores. In some embodiments, such as the illustrative embodiment shown in FIG. 2, CMAS-reactive material 124 present in the partially filled surface-connected columnar void 150 contacts the surface of columnar region 150 in a discrete arrangement 132. In certain embodiments, the CMAS-reactive material 124 forms a continuous or substantially continuous structure 134 along some portions of the surface of the partially filled surface-connected columnar void 150. In some embodiments, the CMAS-reactive material 124 may fill-in the space between the thermal barrier material 122 at least in some portions 136 of some of the partially filled surface-connected columnar voids 150.

As noted previously, CMAS-reactive material includes one or more substance that is highly reactive with liquid CMAS, and forms a reaction product that can form a CMAS-resistant layer and serve as a barrier to prevent further incursion of liquid CMAS into partially filled surface-connected columnar voids, thereby helping to maintain strain tolerance of TBC 120. Typically, though not necessarily exclusively, CMAS-reactive material includes a ceramic material such as an oxide or a nitride. Various types of suitable oxides are described in more detail, below. Examples of suitable nitrides include, but are not limited to, nitrides of tantalum or titanium.

In some embodiments, the CMAS-reactive material used herein to form a CMAS-resistant layer includes a rare-earth oxide, that is, an oxide compound that includes a rare-earth element as one of its constituent elements. As used herein, the terms "rare-earth", "rare-earth element", and "rare-earth metal element" are used interchangeably, and encompass elements of the lanthanide series, yttrium, and scandium. For example, in some embodiments, the oxide includes lanthanum, neodymium, erbium, cerium, gadolinium, or combinations including any one or more of these. Certain complex oxides, that is, oxide compounds that include more than one metal element constituent, have been shown in some circumstances to provide comparatively high reactivity with liquid CMAS. In particular embodiments, the oxide is a complex oxide that includes a rare-earth element and a transition metal element, such as zirconium, hafnium, titanium, or niobium, along with combinations of these. Zirconates, hafnates, titanates, and niobates that include lanthanum, neodymium, cerium, and/or gadolinium are examples of such complex oxides. In some embodiments, the rare-earth metal element of the complex oxide includes gadolinium and the transition metal element includes aluminum, zirconium, or combinations thereof. Some examples of the complex oxides that can be used as CMAS-reactive material include gadolinium aluminates that include, but are not limited to $GdAlO_3$, $Gd_4Al_2O_9$ and the like.

Other complex rare-earth compound structures may be useful as a CMAS-reactive substance in the CMAS-reactive material as described herein. In one embodiment, the substance has a weberite crystal structure. Use of such materials as CMAS-resistant coatings is described in commonly-owned US Patent Application Publication No. US20160115819 A1. The weberite structure is an anion-deficient fluorite-related superstructure. Compared with fluorites, the reduction in the number of anions leads to a decrease in the coordination number of the so-called "B cations" (those of VI coordination) with respect to the "A cations" (VIII coordination), thus allowing the accommodation of diverse cations. The term "weberite crystal structure" as used herein refers to crystal structure of a family of materials with the general formulation $A_2B_2X_7$ or $A_3BX_7$, wherein A includes a rare-earth metal ion, B includes tantalum (Ta) and/or niobium (Nb), and X includes oxygen or fluorine. Further details of the structure have been described in "Complex Ceramic Structures I Weberites", Cai et al., *Acta Crystallographica*. Part B, Vol. 63, Part 3, 2009. While several other compounds possess the same stoichiometry (pyrochlores, layered perovskites etc.), the weberite compounds are isomorphous to the fluoride mineral $Na_2MgAlF_7$.

In some embodiments, a substance having a weberite structure includes a rare-earth metal element, oxygen, and one or more element selected from the group consisting of tantalum and niobium. In particular embodiments, the substance has a nominal formula $$A_3BX_7 \tag{I}$$

wherein A includes a rare-earth metal element, B includes tantalum, niobium, or combinations thereof, and X includes oxygen, fluorine, or combinations thereof. In one example, the substance having a weberite crystal structure includes gadolinium, oxygen, and at least one element selected from the group consisting of tantalum and niobium. As described in the aforementioned patent application, two different weberite oxide ($Gd_3NbO_7$ and $Gd_3TaO_7$) powder compositions were observed to react quickly and completely with liquid CMAS to form a reaction product having a desirably stable apatite-type structure with a nominal composition $Ca_2Gd_8(SiO_4)_6O_2$.

In accordance with some embodiments of the disclosure, a suitable CMAS-reactive material has a nominal composition $$AB_2O_4 \tag{II}$$

wherein A includes an alkaline earth metal and B includes a rare-earth element. The term "nominal composition $AB_2O_4$" as used herein means that some substitution of different elements at the crystal lattice A-sites, B-sites, or O sites are encompassed by the composition as described. For example, some amount of fluorine, nitrogen, or other suitable anion may be substituted for the oxygen at the O site, and the resulting material is considered to be within the scope of the nominal composition, so long as the resultant material retains reactivity with CMAS-type materials.

In some embodiments, the CMAS-reactive materials of nominal composition $AB_2O_4$ described herein are crystallized in an orthorhombic structure of $CaFe_2O_4$. The edge and corner sharing $BO_6$ octahedra in the $AB_2O_4$ compositions of $CaFe_2O_4$-type structure forms a distinctive network.

In certain embodiments, A in $AB_2O_4$ includes strontium. The nominal compositions of $AB_2O_4$ with strontium may further include samarium, gadolinium, yttrium, erbium, lanthanum, europium, or any combinations thereof as B. The nominal compositions described above may further include other substituent elements along with strontium in the A site or with the disclosed rare-earth elements in the B site. In certain embodiments, a nominal composition of $AB_2O_4$ includes $SrY_2O_4$, $SrGd_2O_4$, $SrSm_2O_4$, or any combinations of these compositions. In certain embodiments, a nominal composition of $AB_2O_4$ includes $SrGd_2O_4$, $SrSm_2O_4$, or a combination thereof. $SrGd_2O_4$ was experimentally found to be reactive with CMAS and form apatite phases, even at a temperature of about 1260° C. Reaction of CMAS with $SrY_2O_4$ was found to be complete at a temperature of about 1400° C. $SrSm_2O_4$ is expected to be reactive to CMAS similar to $SrGd_2O_4$. In sharp contrast, $SrYb_2O_4$ was found to be substantially unreactive with the CMAS, and hence may not be useful as a CMAS protective material on the TBCs of the present application.

A partial substitution of aluminum in the B site of $AB_2O_4$ composition may aid in matching the thermal expansion coefficient to the substrate or to the thermal barrier coating, and hence may be beneficial for the overall thermal stability of the CMAS-reactive material. In some embodiments, Al is substituted in the B site of the $AB_2O_4$ composition in an amount in a range from about 5 atomic % to about 50 atomic % of the total B sites in the $AB_2O_4$ composition, without substantially altering the orthorhombic crystal structure of the $AB_2O_4$ considered herein.

In some embodiments, the strontium in A site of $AB_2O_4$ is partially substituted by calcium. Steam stability of calcium oxide was found to be more than the steam stability of strontium oxide. Therefore, a partial calcium substitution for strontium in the A site of $AB_2O_4$ structure may be beneficial in obtaining a high-temperature stable compound, especially when working in environments containing steam. In some embodiments, Ca is substituted in the A site of the $AB_2O_4$ composition in an amount in a range from about 5 atomic % to about 25 atomic % of the total A sites in the $AB_2O_4$ composition, without substantially altering the orthorhombic crystal structure of the $AB_2O_4$ considered herein.

In accordance with some embodiments of the disclosure, a suitable CMAS-reactive material has a nominal composition $$AB_{4-x}D_xO_7 \qquad (III),$$

wherein A includes strontium, calcium, or a combination thereof, B includes a rare-earth element, D includes aluminum, gallium, or a combination thereof, and x is a number less than or equal to 2. The term "nominal $AB_{4-x}D_xO_7$ composition" as used herein means that some substitution of different elements at the crystal lattice A-sites, B-sites, D-sites, or O sites are encompassed by the composition as described. For example, some amount of fluorine, nitrogen, or other suitable anion may be substituted for the oxygen at the O site, and the resulting material is considered to be within the scope of the nominal composition, so long as the resultant material retains reactivity with CMAS-type materials. As used herein, the term "rare-earth element" encompasses elements of the lanthanide series, yttrium, and scandium.

Without being bound by any theory, it is believed that some materials with nominal composition of $AB_{4-x}D_xO_7$ crystallize, at ambient conditions, in a layered perovskite structure having $DO_6$ octahedra, alternating with rocksalt blocks. The A and B cations in the $AB_{4-x}D_xO_7$ structure may be distributed in the rock salt layer. In some embodiments, the CMAS-reactive materials disclosed herein have the layered perovskite-rock salt alternating structure. In some embodiments, the CMAS-reactive materials have a layered perovskite structure belonging to Ruddlesden-Popper subgroup.

A variety of elements may occupy A or B sites in the nominal composition of formula (III). For example, A may include an alkaline earth metal such as barium (Ba), strontium (Sr), calcium (Ca), magnesium (Mg), or any combinations of these. A may further include lanthanum (La), europium (Eu), or any combinations of these.

In some embodiments, B of $AB_{4-x}D_xO_7$ includes a rare-earth element, such as, for example, La, Eu, praseodymium (Pr), neodymium (Nd), samarium (Sm), gadolinium (Gd), terbium (Tb), dysprosium (Dy), holmium (Ho), lutetium (Lu), ytrrium (Y), scandium (Sc), indium (In), rhodium (Rh), or any combinations of these. Moreover, in some embodiments, the B components of the nominal compositions given in formulae (II) and (III) above may further include a transition metal element, exclusive of the rare-earth elements. Examples of the transition metal element may include titanium (Ti), iron (Fe), vanadium (V), chromium (Cr), ruthenium (Ru) manganese (Mn), zirconium (Zr), hafnium (Hf), tungsten (W), molybdenum (Mo), thallium (Tl), or any combinations of these. In certain embodiments, the B sites of $AB_2O_4$ or $AB_{4-x}D_xO_7$ composition are occupied by samarium, gadolinium, yttrium, erbium, lanthanum, neodymium, europium, or combinations of these elements along with any other suitable rare-earth elements or transition metal elements.

In some embodiments, D of $AB_{4-x}D_xO_7$ may include aluminum (Al), gallium (Ga), or a combination of Al and Ga. The nominal compositions described above may further include other substituent elements along with strontium or calcium in the A site with the rare-earth elements in the B site, or with aluminum or gallium in the D site. The above-mentioned elements in the composition of $AB_{4-x}D_xO_7$ can beneficially enhance one or more of the required performance characteristics such as CMAS reactivity, phase stability, coefficient of thermal expansion, and toughness. In some embodiments, one or more of the above-mentioned elements may additionally provide for lower thermal conductivity of the $AB_2O_4$ or $AB_{4-x}D_xO_7$ compositions.

In certain embodiments, A in $AB_{4-x}D_xO_7$ includes strontium. In some embodiments, A in $AB_{4-x}D_xO_7$ includes calcium. In certain embodiments, a nominal composition of $AB_{4-x}D_xO_7$ includes $SrGd_2Al_2O_7$, $SrGd_4O_7$, $CaGd_4O_7$, $SrLa_4O_7$, or any combinations of these compositions.

In some embodiments, a nominal composition of $AB_{4-x}D_xO_7$ includes $SrB_2Al_2O_7$. In certain embodiments, a nominal composition of $AB_{4-x}D_xO_7$ includes $SrGd_2Al_2O_7$. Presence of aluminum or gallium in the D site of $AB_{4-x}D_xO_7$ composition may aid in matching the thermal expansion coefficient to the substrate or to the thermal barrier coating, and hence may be beneficial for the overall thermal stability of the CMAS-reactive material. $SrGd_2Al_2O_7$ was experimentally found to be reactive with CMAS and form apatite phases, even at a temperature of about 1260° C. Thermal expansion and thermal conductivity of $SrGd_2Al_2O_7$ were observed to be similar to that of 8YSZ at 1000° C.

In some embodiments, the A site of $AB_{4-x}D_xO_7$ includes calcium. Steam stability of calcium oxide was found to be greater than the steam stability of strontium oxide, in some embodiments. Therefore, presence of calcium in the A site of $AB_{4-x}D_xO_7$ structure may be desirable to obtain a high-temperature stable compound, especially when working in environments containing steam. In some embodiments, a combination of strontium and calcium occupy the A site of the $AB_{4-x}D_xO_7$ composition. In some embodiments calcium may be present in an amount in a range from about 5 atomic % to about 25 atomic % of the total A sites in the $AB_{4-x}D_xO_7$ composition.

As noted, "x" in formula (III) is a number less than or equal to 2, including 0. Depending on the compositions and crystal structure, x may be an integer or a fraction. In some embodiments, x may be 0, resulting in a nominal composition of $AB_4O_7$. Without being bound by any theory, it is believed that some materials with nominal composition of $AB_4O_7$ crystallize, at ambient conditions, in a calcium diferrite type structure. In certain other embodiments, x may be 2, thereby resulting in a $AB_2D_2O_7$ nominal composition. In embodiments wherein x is 1, aluminum, gallium or a combination of aluminum and gallium will replace only one of the rare-earth element in the B site and therefore result in a nominal composition of $AB_3DO_7$.

Those skilled in the art will appreciate that substitution of various elements within the $AB_2O_4$ and $AB_{4-x}D_xO_7$ structures, such as those noted above, may be suitable so long as certain constraints such as charge compensation and lattice geometrical considerations can be met to maintain the crystal structure. For instance, where substitution of one or more cation sites (or filling one or more vacant sites) would result in a charge imbalance in the stoichiometric $AB_{4-x}D_xO_7$, the composition of the oxide may shift to include slightly less or more oxygen to compensate for the apparent imbalance.

In other embodiments, the CMAS-reactive material includes an NZP type material, as described in commonly owned US Patent Application Publication No. US20160168684 A1. The term "NZP-type material" as used herein refers to a family of materials having a crystal structure similar to $NaZr_2P_3O_{12}$ (the parent compound from which the name is derived). The NZP materials typically have a three-dimensional "open" framework structure, with $ZrO_6$ octahedra linked to $PO_4$ tetrahedra. In some embodiments, the NZP-type material has a hexagonal structure. As for the other materials described above, NZP-type materials have been described previously as candidates for bulk coatings. In the present description, however, these materials are disposed in the partially filled surface-connected columnar void 150 of the TBC 120.

In one embodiment employing NZP-type material as a substance of the CMAS-reactive material, the substance is a material having formula (IV):

$$A_{1-x}B_xZr_{4-y}D_y(PO_4)_z \qquad (IV)$$

wherein A and B are selected from the group consisting of alkaline earth metals and rare-earth metals, D is hafnium or titanium; x is a number from 0 to 1; y is a number from 0 to 4; and z is 3 or 6. Non-limiting examples of suitable alkaline earth metals include beryllium, magnesium, calcium, strontium, barium, or combinations thereof. Non-limiting examples of suitable rare-earth metals include scandium, yttrium, lanthanum, cerium, gadolinium, praseodymium, neodymium, promethium, samarium, europium, terbium, dysprosium, holmium, erbium, thulium, ytterbium, lutetium, or combinations thereof.

In some embodiments, the CMAS-reactive material includes $$MZr_4(PO_4)_6 \qquad (V),$$

wherein M includes at least one alkaline earth metal. As noted earlier, M may include beryllium, magnesium, calcium, strontium, barium, or combinations thereof. In certain embodiments, the CMAS-reactive material includes $Ca_xSr_{1-x}Zr_4(PO_4)_6$, wherein x is a number from 0 to 1. In certain embodiments, the CMAS-reactive material includes $CaZr_4(PO_4)_6$, $SrZr_4(PO_4)_6$, $Ca_{0.5}Sr_{0.5}Zr_4(PO_4)_6$, or combinations thereof, which was observed to react quickly and completely with liquid CMAS, forming stable solid reaction products such as silicates and phosphates that may provide desirable barrier behavior when formed within surface-connected columnar voids 140 of TBC 120.

In other embodiments, the CMAS-reactive material has a perovskite crystal structure and includes (a) a rare-earth element, (b) tantalum, niobium, or a combination of tantalum and niobium, and (c) oxygen. In one embodiment, the perovskite-structured substance is an oxide having a nominal composition of $AB_3O_9$, where A includes the rare-earth element, and B includes the niobium, tantalum, or combination of tantalum and niobium. A perovskite-structured oxide of nominal composition $GdTa_3O_9$ is a particular example of such a substance; this composition was observed in a laboratory test to rapidly and completely react with a liquid CMAS composition, forming a desirably solid, dense, blocky crystalline phase that may provide a suitable barrier to liquid CMAS penetration into TBC 120.

In other embodiments, the CMAS-reactive material includes a compound having a scheelite, fergusonite, or wolframite crystal structure, and having a nominal formula $$ABX_4 \qquad (VI),$$

wherein A includes a rare-earth element (and, optionally, an alkaline earth element), B includes tantalum, niobium, or a combination of tantalum and niobium, and X includes oxygen, nitrogen, or a combination of nitrogen and oxygen. In certain embodiments, A in this formula includes yttrium, gadolinium, lanthanum, neodymium, ytterbium, or combinations of any of the foregoing. A particular example of such material is $YTaO_4$, which in laboratory tests was observed to react quickly with liquid CMAS to form a stable crystalline solid reaction product.

Without being bound by any theory it is believed that the materials with the disclosed nominal compositions of formulae (I)-(VI) described herein are highly reactive with the CMAS composition and, therefore, may react with molten CMAS composition such that the kinetics of reaction of the materials having formulae (I)-(VI) with the CMAS to form a stable, solid phase competes with the infiltration of molten CMAS into the pores of the thermal barrier coating. Accordingly, further penetration of the molten CMAS composition through the pores of the TBCs may be avoided. Further, the above-mentioned CMAS-reactive materials may form substantially stable solid reaction products when in contact with the molten CMAS composition. Formation of the solid product phase may plug the vertical cracks in the thermal barrier coatings, and increase the viscosity of the CMAS composition, thereby avoiding its infiltration, and thus extending the life of the TBC layer.

This is in contrast to previously known TBC systems, where any of the material compositions disclosed in formulae (I)-(VI) above might have been used as thermal barrier materials. These materials were not known to be reactive with CMAS to form a resistant layer that can mitigate further infiltration of CMAS. Further, in the previously known TBC systems, if any of the materials of formulae (I)-(VI) is used as a thermal barrier coating, a part of the TBC may be sacrificed for the CMAS mitigation, and the reaction product of CMAS and the TBC formed in the TBC layer may unfavorably alter a chemical or structural configuration of the thermal barrier coating.

In some embodiments, the CMAS-reactive material 124 is present in the TBC 120 in an effective amount to react with the CMAS composition at an operating temperature of the thermal barrier coating, thereby forming a reaction product having one or both of melting temperature and viscosity greater than that of the CMAS composition. The term "effective amount" as used herein refers to an amount (for example, volume) of the CMAS-reactive material sufficient to effectively increase one or both the melting temperature and viscosity of the reaction product formed.

The term "operating temperature" of the TBC refers to the temperature that the TBC is exposed to in the turbine operating environment. In some embodiments, the operating temperature of the TBC refers to the surface temperature of the thermal barrier coating. The term "reaction product" as used herein refers to a product or a mixture of products formed by reacting the CMAS-reactive material with the CMAS composition. In certain embodiments, the reaction product may include a mixture of products. Accordingly, the terms "reaction product" and "reaction product mixture" are used herein interchangeably. In some such instances, one or more products in the reaction product mixture may include new crystal phases that have a melting temperature greater than that of the CMAS composition. Further, in some such instances, the reaction product mixture may have a viscosity greater than that of the CMAS composition.

In some embodiments, it is desirable to have a higher melting point for the reaction product than the surface temperature of the thermal barrier coating, so that the reaction product may act as a solid barrier for the CMAS that is further deposited on the surface. In certain embodiments, the reaction product of CMAS and CMAS-reactive material has a melting temperature greater than about 1200° C. In some embodiments, the reaction product has a melting temperature greater than about 1260° C.

In some embodiments, the CMAS-reactive material is present in the TBC 120 in an amount such that the melting temperature of the reaction product is increased at least to the surface temperature of the thermal barrier coating. In some embodiments, the CMAS-reactive material is present in the TBC 120 in an amount such that the melting temperature of the reaction product increases by at least about 10° C. above the surface temperature of the TBC during its operation. In some embodiments, the CMAS-reactive material is present in the TBC 120 in an amount such that the melting temperature of the reaction product increases by about 40° C. to about 100° C. above the surface temperature of the TBC during its operation. Thus, by way of an example, if the surface temperature of the TBC during operation is about 1230° C., then the CMAS-reactive material is present in amount such that the melting temperature of the reaction product increases to at least about 1240° C.

In some embodiments, the CMAS-reactive material is present in the TBC 120 in an amount such that the viscosity of the reaction product increases by at least about 10 centipoises above the viscosity of the CMAS composition, at the operating temperature of the thermal barrier coating. In some embodiments, the CMAS-reactive material is present in the TBC 120 in an amount such that the viscosity of the reaction product increases by about 10 centipoises to about 1000000 centipoises above the viscosity of the CMAS composition, at the operating temperature of the thermal barrier coating. In some embodiments, the CMAS-reactive material 124 deposited in the partially filled surface-connected columnar void 150 may be porous. In some embodiments, a porosity in the CMAS-reactive material 124 is greater than 15 volume % of the CMAS-reactive material 124 deposited in the partially filled surface-connected columnar void 150.

Rare-earth elements are included in the CMAS-reactive material 124 in one group of embodiments, as disclosed earlier. While several compounds including these elements may show desirable reactivity with CMAS, there may be certain deleterious effects attributable to the presence of these elements within TBC 120. Notably, it has been discovered that where CMAS-reactive material 124 is disposed at or near the interface between TBC 120 and bond coat 130, chemical interaction between the rare-earth-bearing CMAS-reactive material and an oxide formed by the bond coat at elevated temperature (known as a thermally-grown oxide or TGO)—can result in premature spallation of TBC 120.

To mitigate this potential issue, some embodiments of the present disclosure employ the presence of a columnar cavity 152 (illustrated in FIG. 2) disposed within at least some of the partially filled surface-connected columnar voids 150 to substantially separate CMAS-reactive material 124 from the bond coat 130 or, if no bond coat is present, from the substrate 110. The columnar cavity 152 is present in at least a portion of the partially filled surface-connected columnar voids 150 preventing a contact of the CMAS-reactive material 124 with the bond coat 130 or substrate 110. In some embodiments, the columnar cavity 152 is interposed between the substrate 110 and the CMAS-reactive material 124 as illustrated in FIG. 2. Columnar cavity 152 substantially prevents chemical interaction between CMAS-reactive material 124 and a TGO disposed on substrate 110 or, if present, bond coat 130. The columnar cavity 152 may be positioned in any part of the partially filled surface-connected columnar voids of the TBC 120 to prevent the ingress of the CMAS-reactive material into the substrate or the bond coat. In some embodiments, a volume of cavities present in a first region 126 of the TBC 120, disposed proximate to the substrate, is greater than the volume of cavities present in a second region 128 of the TBC 120, disposed distant from the substrate. The first region 126 and the second region 128 may be of any heights. In some embodiments, the first region 126 denotes the region between the substrate (or the bond coat, if present) to 50% thickness t of the TBC 120. In some embodiments, the cavities 152 are disposed such that less than 5 volume % of the total amount of the CMAS-reactive material 124 contacts the substrate (or the bond coat/TGO) during operation. In certain embodiments, less than 1 volume % of the total amount of the CMAS-reactive material 124 contacts the substrate (or the bond coat/TGO) during operation. In exemplary embodiments, the first region 126 is substantially free of the CMAS-reactive material 124.

Figure 3:
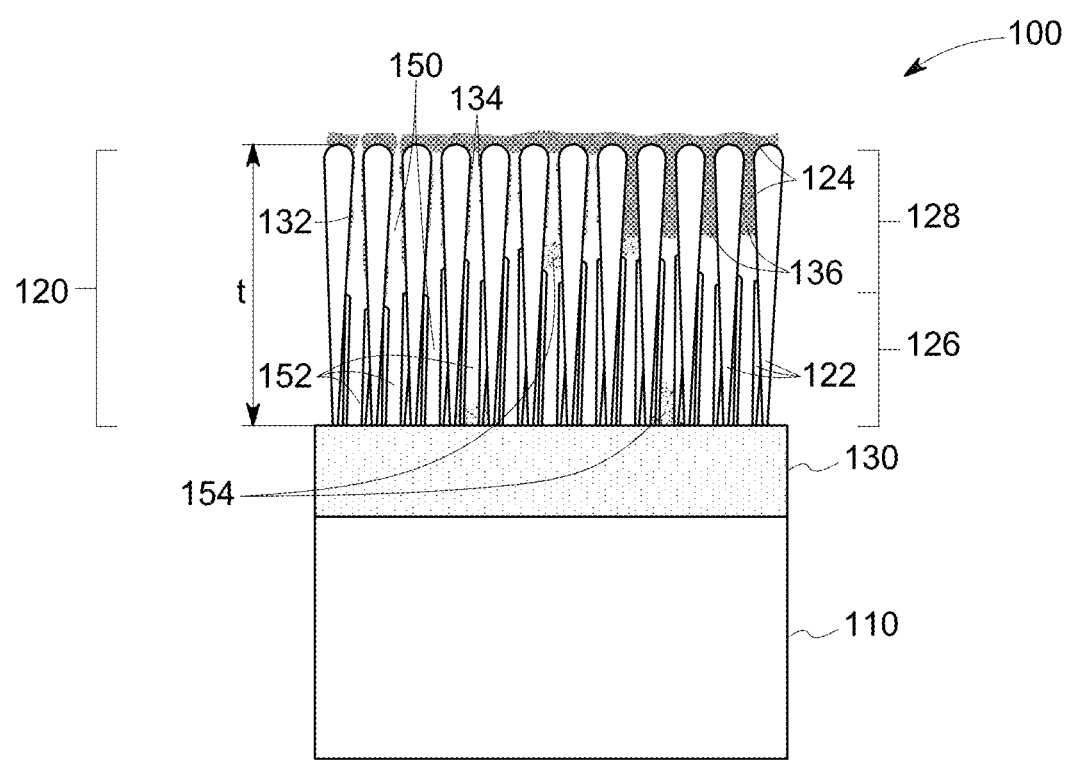
FIG. 3 is a schematic cross-section illustrating some embodiments of the present disclosure.

In some embodiments, in addition to the columnar cavity 152, the partially filled surface-connected columnar void 150 of the present disclosure may further include a barrier material 154 (illustrated in FIG. 3) disposed within at least some of the partially filled surface-connected columnar voids 150 to substantially physically separate CMAS-reactive material 124 from bond coat 130 or, if no bond coat is present, from the substrate 110. The barrier material 154 may be disposed in any part of the partially filled surface-connected columnar voids 150 of the TBC 120 to prevent the ingress of the CMAS-reactive material into the substrate or the bond coat. In some embodiments, the barrier material 154 is interposed between the substrate 110 and the columnar cavity 152 as illustrated in FIG. 3. In some embodiments, an amount of the barrier material 154 at the first region 126 of the TBC 120, is greater than an amount of the barrier material 154 at the second region 128.

In some embodiments, barrier material 154 includes aluminum oxide, cerium oxide, yttrium oxide, zirconium oxide, hafnium oxide, tantalum oxide, niobium oxide, titanium oxide, or combinations thereof. Some of these oxides may, where appropriate, include a sufficient amount of stabilizer (often a rare-earth element) to reduce propensity of the oxide to undergo stress-generating phase transformations during heat-up and cool-down, but the amount of rare-earth stabilizer may be maintained sufficiently small to mitigate issues of reactivity with the aforementioned TGO. In some embodiments, barrier material 154 includes less than about 40 atomic percent rare-earth element content. In certain embodiments, barrier material includes less than about 10 atomic percent rare-earth element content, for example, as found in the commonly used zirconia stabilized with 8 weight percent yttria ("8YSZ").

In some embodiments, the effective amount of CMAS-reactive material present in the partially filled surface-connected columnar voids 150 of the TBC 120 may depend in part on the structure and microstructure of the TBC 120, and on the specific volume of the reaction product formed between CMAS and the CMAS-reactive material. In certain embodiments, at least about 5 volume % of the partially filled surface-connected columnar voids 150 of the TBC 120 is occupied by CMAS-reactive material. In some embodiments, the CMAS-reactive material occupies about 10 volume % to about 70 volume % of the partially filled surface-connected columnar voids 150. In some embodiments, the CMAS-reactive material 124 is disposed in an amount in a range from about 10 volume percent to about 50 volume percent of the plurality of partially filled surface-connected columnar voids 150. In some embodiments, the volume fraction of the partially filled surface-connected columnar voids 150 that is occupied by CMAS-reactive material 124 is a function of the cross-sectional depth, with a comparatively higher concentration of CMAS-reactive material at or near the TBC 120 surface trending to comparatively low concentrations as distance from the TBC surface increases (that is, as distance away from substrate decreases). For instance, as an illustrative non-limiting example, an occupied (by CMAS-reactive material 124) partially filled surface-connected columnar void 150 is at least about 10 volume % at the second region 128 (FIG. 2) of the TBC 120, trending toward less than 5 volume % in the first region 126 of the TBC 120. In an exemplary embodiment, CMAS-reactive material 124 occupies less than 2 volume % of the partially filled surface-connected columnar voids 150 at a point below the half-thickness of the partially filled surface-connected columnar void 150. In some embodiments, the CMAS-reactive material 124 occupies only the second region 128, without occupying any part of the first region 126. In some embodiments, the CMAS-reactive material 124 is present in the partially filled surface-connected columnar voids 150 in less than 70% of the thickness t of the TBC 120. In some embodiments, less than 50% of the thickness t of the TBC has CMAS-reactive material 124 in the partially filled surface-connected columnar voids 150. In some embodiments, the partially filled surface-connected columnar voids 150 has the CMAS-reactive material in less than 40% of the thickness t of the TBC 120 and the cavity in greater than 60% of the thickness t of the TBC 120.

In certain embodiments, at least about 10 volume % of the partially filled surface-connected columnar voids 150 of the TBC 120 is occupied by columnar cavity 152. In some embodiments, the columnar cavity 152 occupies about 20 volume % to about 95 volume % of the partially filled surface-connected columnar voids 150. In some embodiments, the columnar cavity 152 is present in an amount in a range from about 30 volume percent to about 90 volume percent of the plurality of partially filled surface-connected columnar voids 150. In some embodiments, the volume fraction of the partially filled surface-connected columnar voids 150 that is occupied by columnar cavity 152 is a function of the cross-sectional depth, with a comparatively higher concentration of columnar cavities at or near the substrate 110 trending to comparatively low concentrations as distance from the substrate 110 increases (that is, as distance away from TBC surface decreases). For instance, as an illustrative non-limiting example, the columnar cavity 152 present in the partially filled surface-connected columnar voids 150 in the first region 126 of the TBC 120 is at least about 75 volume % of the partially filled surface-connected columnar voids 150, trending towards less than 25 volume % in the second region 128 of the TBC 120.

TBC 120 is shown in FIGS. 1, 2, 3 as a single layer, but in some embodiments, the TBC 120 may include a plurality of layers. In some embodiments, the article may further include one or more additional layers disposed on the Columnar cavity or on the TBC to form a top coat layer (not shown in Figures). Non-limiting examples of suitable topcoat layers include erosion resistant layers.

One potential advantage of the techniques described herein is that it allows the use of an outermost layer, such as second region 128, that has desirable wear, erosion, thermal, or other properties, while disposing CMAS-reactive material in the places where it is most needed. Many of the materials that are highly reactive with CMAS lack suitable levels of mechanical properties or other properties to be desirable choices for a bulk coating that is exposed to the ambient service environment of, for instance, a gas turbine. On the other hand, zirconia stabilized with 7%-9% yttria by weight is a very attractive material for use in TBCs because of its advantageous thermal and mechanical properties, but its resistance to CMAS is not particularly high. The life of such a TBC may be enhanced by applying CMAS-reactive material to vulnerable areas (such as the surface-connected voids 140 as noted herein) without resorting to the use of a bulk topcoat made of a CMAS-resistant material, which may itself be more vulnerable than YSZ to erosion or other degradation mechanism.

In some embodiments, a method of manufacturing an article is EDAX presented. The method includes disposing a calcium-magnesium-aluminum-silicon-oxide (CMAS)-reactive material within at least some surface-connected columnar voids in a thermal barrier coating disposed on a substrate such that the CMAS-reactive material is physically separated from the substrate by a columnar cavity having an aspect ratio greater than 3.

The TBC may be disposed or otherwise formed on a bond coat (if present) or on the substrate directly by any of a variety of conventional techniques, including vapor deposition, such as physical vapor deposition (PVD), electron beam physical vapor deposition (EBPVD); plasma spray, such as air plasma spray (APS), suspension plasma spray (SPS), and vacuum plasma spray (VPS); other thermal spray deposition methods such as high velocity oxy-fuel (HVOF) spray, detonation, or wire spray; chemical vapor deposition (CVD), sol-gel method, or combinations of two or more of the afore-mentioned techniques The particular technique used for disposing, depositing or otherwise forming the TBC may depend on one or more of the composition of the thermal barrier coating, the thickness, and the physical structure desired for the thermal barrier coating. In certain embodiments, the TBC is disposed on the substrate using EBPVD or SPS technique to obtain the surface-connected columnar voids.

As can be noted, the microstructure of the TBC 120 obtained by an EBPVD or SPS technique is substantially different from the microstructure of the TBC that can be obtained by other deposition techniques such as, for example, air plasma spray (APS) technique. A TBC obtained by the APS method (henceforth APS coated TBC) generally has splats of thermal barrier material with some pores in between. However, these pores are not columnar voids, and an infiltration of the pores that are connected to the top surface of the APS coated TBC leaving some cavities left in between the substrate and the infiltrated material is simple. In some instances, attempts were made to infiltrate greater thickness of the APS coated TBC to obtain more protection. In contrast to this, in the TBC 120 formed by the EBPVD or SPS technique, the surface-connected columnar voids are the through-cracks that are often oriented such that an attempt at infiltrating the TBC with a CMAS-reactive material typically infiltrates the TBC in the cross-sectional thickness to a region proximate to the substrate, without encountering any barrier to the infiltration. Hence, partial infiltration of the CMAS-reactive material in the surface-connected columnar voids 140 of the TBC 120 is challenging as compared to infiltration of pores of the APS coated TBC.

In some embodiments, the TBC may be disposed on the bond coat. In such instances, the bond coat may be applied, deposited or otherwise formed on the substrate by any of a variety of conventional techniques including, vapor deposition, such as physical vapor deposition (PVD), electron beam physical vapor deposition (EBPVD); plasma spray, such as APS and vacuum plasma spray (VPS); other thermal spray deposition methods such as high velocity oxy-fuel (HVOF) spray, detonation, or wire spray; chemical vapor deposition (CVD), sol-gel method, or combinations of two or more of the afore-mentioned techniques. In some embodiments, a plasma spray technique, such as that used for the thermal barrier coating, may be employed to dispose the bond coat on the substrate.

A method for making articles such as article 100 (as illustrated in FIGS. 1, 2, 3) may include disposing CMAS-reactive material 124 within surface-connected columnar voids 140 of TBC 120 at an effective amount to substantially prevent incursion of CMAS materials into the voids 140. While other techniques have been described in which material is disposed on internal surfaces of ceramic coatings, for instance to prevent sintering of columnar microstructural features, the present technique in accordance with some embodiments involves the disposition of an effective amount of CMAS-reactive material 124 to substantially prevent incursion of CMAS into voids in which the CMAS-reactive material 124 is disposed.

Disposing CMAS-reactive material typically involves infiltrating an existing TBC 120 (as illustrated in FIGS. 1, 2, and 3) with a vapor or liquid into the surface-connected columnar voids 140 of the TBC 120. In the case of a vapor infiltrant, CMAS-reactive material 124 may be formed by chemical interaction with the environment within voids 140 such as by reaction with thermal barrier material of TBC 120. Liquid infiltrants of the CMAS-reactive material, on the other hand, include one or more liquids such as water, or a carbon-bearing liquid such as an alcohol or acetone. In one embodiment involving a liquid infiltrant of the CMAS-reactive material, the liquid includes a carrier fluid and a plurality of particles suspended within the carrier fluid. The particles may include the CMAS-reactive material 124 composition, or may be a chemical precursor to this composition, designed to further react during processing or during service to produce CMAS-reactive material 124. In an alternative embodiment, the liquid includes a solvent, with a solute dissolved in the solvent. The solute may be a precursor of CMAS-reactive material 124, such as a nitrate, sulfate, other salt, or other compound type, and the solvent is selected to appropriately accommodate the desired solute. More than one solute may be dissolved in the solvent. The solute may be reacted to form CMAS-reactive material 124, such as by heating to decompose the solute, or by reacting multiple solutes together, or by reacting one or more solute with the thermal barrier material, or some combination of these.

The liquid infiltrant of the CMAS-reactive material may be infiltrated into the surface-connected columnar voids 140 using any appropriate technique. In some embodiments, the liquid is simply placed in contact with TBC 120, such as by dipping or brushing, allowing capillary action to draw the liquid and CMAS-reactive material 124 (or precursor thereof) into the surface-connected columnar voids 140. Vacuum infiltration techniques are applied in some embodiments to further assist in driving liquid into surface-connected columnar voids 140. Other techniques such as electrophoretic deposition may be used in conjunction with a suspension to deposit particles of CMAS-reactive material 124 or a precursor of CMAS-reactive material 124 into voids 140. Use of electrophoretic deposition to deposit material within the voids of a ceramic coating is described e.g., in U.S. Pat. No. 7,780,832.

Where a liquid infiltrant of the CMAS-reactive material is applied, whether the liquid is carrying a suspension of particles or has a solute dissolved in it, in some embodiments the method further includes volatilizing the liquid to form a residue that is disposed in surface-connected columnar voids 140. The residue may be a precursor to CMAS-reactive material 124, or it may be the CMAS-reactive material 124 composition itself. Volatilizing is typically done by heating the infiltrated coating to a temperature where the liquid is driven off at an acceptable rate. Often the heating rate ("ramp-rate") to attain the desired temperature for volatilization is controlled to avoid building up undue pressure within the coating, which could damage the coating and/or could result in incomplete deposition of CMAS-reactive material 124 due to liquid being forced out by rapid bubble formation and escape.

To form the article illustrated in FIG. 2, the method further includes interposing the columnar cavity 152 between CMAS-reactive material 124 and substrate 110 in at least some partially filled surface-connected columnar voids 150. This disposition of columnar cavity 152 may be accomplished by any means of retaining a portion of the surface-connected columnar voids 140 while depositing the CMAS-reactive material 124, or by any means of creating a columnar cavity after the deposition of the CMAS-reactive material 124. In some embodiments, a physical barrier is placed at a certain height of the at least some surface-connected columnar voids 140, thus precluding the infiltrant of the CMAS-reactive material from entering beyond (below) the physical barrier.

In some embodiments, the method includes disposing a fugitive material within the at least some surface-connected columnar voids 140 in a region that is proximate to the substrate. As used herein, a "fugitive material" is a material that initially occupies some volume and, upon removal via one or more processing steps, leaves behind a cavity in a substantial portion of the earlier occupied volume. One example for a fugitive material is a material that burns off during a heat-treatment step, thus leaving behind a cavity in the earlier occupied volume. In some embodiments, the fugitive material includes a mineral oil, polyethylene glycol, paraffin wax, polyvinyl alcohol, graphite, or any combinations thereof. In some embodiments, the fugitive material includes mineral oil, polyethylene glycol, paraffin wax, or combinations thereof.

In some embodiments, the method of disposing the fugitive material within the at least some surface-connected columnar voids 140 includes infiltrating the at least some surface-connected columnar voids 140 with a first liquid. The first liquid may include a melt of the fugitive material, the fugitive material suspended in a carrier fluid, the fugitive material dissolved in a solvent, or combinations thereof.

In some embodiments, the method further includes infiltrating the at least some surface-connected columnar voids with a second liquid. In some embodiments, the second liquid is the previously described liquid infiltrant of the CMAS-reactive material. In certain embodiments, the second liquid includes a precursor of the CMAS-reactive material.

In some embodiments, the second liquid is infiltrated in the surface-connected columnar voids over the first liquid, without pre-drying the first liquid. In this embodiment, the first liquid and the second liquid are controlled such that the first liquid is at least partially immiscible with the second liquid.

In some embodiments, the method includes drying at least a part of the first liquid so that the liquid content of the first liquid is reduced and the fugitive material is retained. Drying may at least partially evaporate the first liquid, if the first liquid is a carrier fluid or a solvent. Drying may densify the first liquid, if the first liquid is a melt of the fugitive material. Drying of the first liquid may yield a dried fugitive material. In some embodiments, drying of the first liquid is carried out to form the dried fugitive material before the infiltration of the second liquid. The dried fugitive material may be dense enough and adhered well to the surfaces of the surface-connected columnar voids to provide a physical barrier to the infiltration of the second liquid. Therefore, in some embodiments, the second fluid does not pass through or along sides of the dried fugitive material towards substrate, during or after the infiltration of the second fluid.

The method further includes drying at least a part of the second liquid after infiltration to form a dried infiltrant of the CMAS-reactive material. In some embodiments, the dried infiltrant of the CMAS-reactive material is in solid form after evaporating substantially all the carried fluid or the solvent present in the second liquid. In the embodiments, wherein the second liquid includes precursor of the CMAS-reactive material, the drying of the second liquid may retain the precursor of the CMAS-reactive material.

The method further includes heat-treating of the fugitive material and the CMAS-reactive material deposited in the surface-connected columnar voids 140. Depending on the pre-heat-treatment processes such as, for example, drying, the heat-treatment may be carried out on different forms of the fugitive material and the CMAS-reactive material. For example, the heat-treatment may be carried out on a combination of the first liquid and the second liquid, on a combination of the dried fugitive material and the second liquid, on a combination of the first liquid and the dried infiltrant of the CMAS-reactive material, or on a combination of the dried fugitive material and the dried infiltrant of the CMAS-reactive material. The heat-treatment may remove the fugitive material, may cause a reaction that allows the precursor of the CMAS-reactive material to form the CMAS-reactive material, or a combination thereof.

The heat-treatment may be carried out by a slow heating or step-wise heating to a temperature less than 1000° C. in an oxygen-containing atmosphere such as, for example, air. A slow or step-wise heating of the combination aids to dissociate any bound liquid and to burn out the fugitive material. The heat-treatment may be effected using a conventional furnace or by using such methods as, for example, microwave sintering, laser sintering, infrared sintering, and the like. In some embodiments, heat-treatment may be accomplished at a rate from about 0.1° C./min to about 15° C./min to a temperature in a range from greater than 150° C. and less than 1000° C., and/or holding at that temperature for up to about 24 hours.

In some embodiments, wherein the dried fugitive material and the CMAS-reactive material or the precursor of the CMAs-reactive material present in the dried infiltrant of the CMAS-reactive material are heated together, the fugitive material may burn out and the gases and/or vapors of the fugitive material may pass through the pores of the dried infiltrant of the CMAS-reactive material. In some embodiments, the fugitive material may be burned after an initial sintering (pre-sintering) of the CMAS-reactive material. In these embodiments, the gases and/or vapors of the fugitive material may pass through the pores of the pre-sintered CMAS-reactive material. In some embodiment, a porosity in the pre-sintered CMAS-reactive material is greater than 15 volume % aiding the outflow of the gases/vapors of the fugitive material. In some embodiments, the CMAS-reactive material may be further heat-treated, after burning off the fugitive material to aid further sintering of the material. The burning off of the fugitive material leaves behind the columnar cavity 152 in the partially filled surface-connected columnar voids 150, as illustrated in FIG. 2 earlier.

In some embodiments, the method of forming the article 100 includes disposing a fugitive material within at least some surface-connected columnar voids in a thermal barrier coating, disposing a calcium-magnesium-aluminum-silicon-oxide (CMAS)-reactive material over the fugitive material, and removing the fugitive material to create a columnar cavity in the thermal barrier coating in between the CMAS-reactive material and the substrate. As noted earlier, in some embodiments, an aspect ratio of the at least some surface-connected columnar voids is greater than 3. In some embodiments, disposing the fugitive material includes infiltrating the at least some surface-connected columnar voids with a melt of the fugitive material, the fugitive material suspended in a carrier fluid, the fugitive material dissolved in a solvent, or combinations thereof. Further, in some embodiments, disposing the CMAS-reactive material includes infiltrating a precursor of the CMAS-reactive material and reacting the precursor to form the CMAS-reactive material.

In some embodiments, the method of forming the article 100 includes disposing the fugitive material as a melt to a desired thickness in the surface-connected columnar voids of the thermal barrier coating of the article, infiltrating a CMAS-reactive material precursor solution on top of the fugitive material, drying the solvent out of the CMAS-reactive material precursor, repeating the infiltration of the CMAS-reactive material precursor solution to get a desired amount of the CMAS-reactive material precursor, and heat-treating the TBC. The fugitive material burns away and leaves columnar cavities. The CMAS-reactive material precursor is converted to the CMAS reactive material. The specific temperatures for drying and the heat-treatment may depend on the fugitive material and the CMAS-reactive material precursor. In some embodiments, a temperature range from about 250° C. to about 800° C. is used for heat-treatment. The fugitive material may burn away before, during or after the conversion of the CMAS-reactive material precursor to the CMAS-reactive material.

As illustrated in FIG. 3, in some embodiments, the method further includes interposing a barrier material 154 between CMAS-reactive material 124 and substrate 110. This deposition of barrier material 154 may be accomplished by any means, such as those described above for disposing CMAS-reactive material 124. In some embodiments, a suspension of particles comprising the desired barrier material composition, a precursor of the barrier material, or combinations thereof, is infiltrated into the surface-connected columnar voids 140 before disposing the fugitive material into the voids 140. The liquid portion of this suspension is volatilized along with volatilizing the fugitive material, and then the barrier material 154 is deposited on the substrate by the above-mentioned heat-treatment.

The TBC in accordance with some embodiments of the present disclosure are particularly useful in providing protection or mitigation against the adverse effects of environmental contaminant compositions for TBCs used with metal substrates of newly manufactured articles. However, the TBCs of the embodiments presented herein are also useful in providing such protection or mitigation against the adverse effects of environmental contaminant compositions for refurbished worn or damaged thermal barrier coatings, or in providing TBCs having such protection or mitigation for articles that did not originally have a thermal barrier coating.

According to embodiments of the disclosure, the TBCs are provided with at least partial and up to complete protection and mitigation against the adverse effects of environmental contaminant compositions that can deposit on the surface of such coatings during normal turbine operation. In particular, the TBCs of the present disclosure are provided with at least partial and up to complete protection or mitigation against the adverse effects of CMAS-reactive material and the CMAS deposits on such coating surfaces. In addition to turbine engine parts and components, the TBC 120 of the present disclosure may provide useful protection for metal substrates of other articles that operate at, or are exposed to, high temperatures, as well as to environmental contaminant compositions.

The TBCs of the present disclosure may be useful in a wide variety of turbine components (e.g., turbine engine components) that are operated at, or exposed to, high temperatures. Non-limiting examples of suitable turbine engine components include turbine airfoils such as blades and vanes, turbine shrouds, turbine nozzles, buckets, combustor components such as liners and deflectors, heat shields, augmentor hardware of gas turbine engines, and the like. The TBCs of the present disclosure may be disposed over a portion or over all of the metal substrate. For example, with regard to airfoils such as blades, the TBCs of the present disclosure are typically used to protect, cover or overlay portions of the metal substrate of the airfoil other than solely the tip thereof, for example, the TBCs cover the leading and trailing edges and other surfaces of the airfoil.

In some embodiments, a turbine engine component is also presented. The turbine engine component includes a TBC disposed on a superalloy substrate. The TBC includes a thermal barrier material and partially filled surface-connected columnar voids. The partially filled surface-connected columnar voids are interspersed with the thermal barrier material in the thermal barrier coating. At least some of the partially filled surface-connected columnar voids include a calcium-magnesium-aluminum-silicon-oxide (CMAS)-reactive material disposed within, such that the CMAS-reactive material is physically separated from the substrate by a columnar cavity having an aspect ratio greater than 3.

EXAMPLES

The following examples are presented to further illustrate non-limiting embodiments of the present disclosure.

Example 1

A coating of the thermal barrier material was deposited by EBPVD method on a metal substrate. The coating was infiltrated with heavy mineral oil such that substantially 100% of the columnar voids of the coating were infiltrated with the mineral oil. A porous tissue was used to blot the surface of the coating to wick the mineral oil out of the top of the columnar voids of the coating, leaving mineral oil in the pores present in the bottom of the coating. A CMAS-reactive material precursor solution was prepared by dissolving aluminum nitrate in ethanol. The CMAS-reactive material precursor solution was infiltrated into the coating over the mineral oil. The immiscibility of the oil and ethanol solution prevented mixing of CMAS-reactive material precursor solution and the mineral oil present in the columnar voids. The substrate, along-with the coating and infiltrated components was dried at a temperature below the boiling point (80-100° C.) of the mineral oil to evaporate the solvent of the CMAS-reactive material precursor solution without evaporating the mineral oil. The steps of infiltration of the CMAS-reactive material precursor solution and drying was repeated 3 times to obtain a desired amount of the CMAS-reactive material precursor infiltrate. The dried coating was heat-treated above the boiling point of the oil (~300° C.-700° C.) to remove the oil and to convert the CMAS-reactive material precursor to a CMAS-reactive material infiltrated selectively in the top part of the pores of the TBC.

Figure 4:
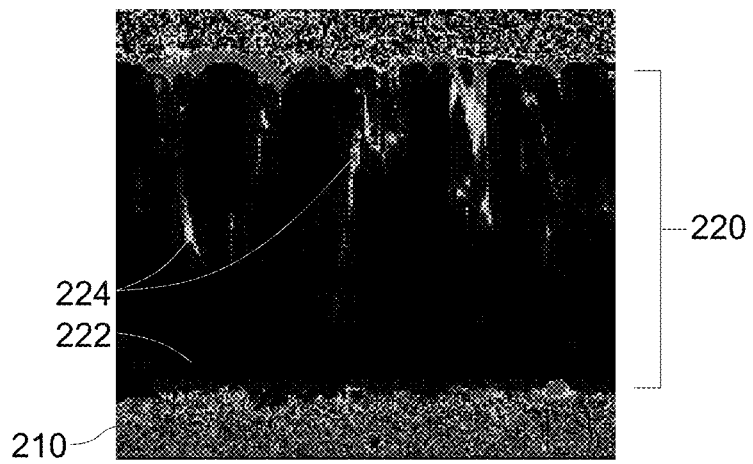
FIG. 4 represents a schematic WDS map of weight percentage of aluminum infiltrated into a thermal barrier coating using mineral oil as a fugitive material, in accordance with some embodiments of the present disclosure.

FIG. 4 represents a schematic illustration of wavelength-dispersive spectroscopy (WDS) map of weight percentage of aluminum in the TBC 220 deposited on the metal substrate 210 by using the mineral oil as the fugitive material. A substantial amount of aluminum 224 is seen along the top part of the TBC 220 in between the thermal barrier material 222 and the bottom part of TBC 220, near the substrate 210 is completely free of aluminum 224. The aluminum deposition is observed in less than 50% of height (thickness) of the TBC 220, near the surface.

Example 2

A coating of the thermal barrier material was deposited by EBPVD method on a metal substrate. About 20 wt. % polyethylene glycol 4000 (PEG-4000) was dissolved in water to form a solution. The coating was infiltrated with this solution such that substantially 100% of the columnar voids of the coating were infiltrated with the solution. The infiltrated coating was dried at a temperature of about 80° C. to evaporate water without evaporating the PEG-4000. The drying further aided liquefying the PEG-4000, thereby reducing viscosity so that the PEG-4000 could wick into the narrow cracks. The step of infiltration of the PEG-4000 and drying was repeated once. The coating was cooled to room temperature to solidify the PEG-4000. A CMAS-reactive material precursor solution was prepared by dissolving aluminum nitrate in ethanol. The CMAS-reactive material precursor solution was selectively infiltrated into the coating over the solidified PEG-4000. The CMAS-reactive material precursor solution did not readily dissolve the PEG-4000.

The steps of infiltration of the CMAS-reactive material precursor solution and drying were repeated 3 times to obtain a desired amount of the CMAS-reactive material precursor infiltrate. The dried coating was heat-treated above the boiling point of the PEG-4000 (~500° C.-700° C.) to remove the PEG-4000 and to convert the CMAS-reactive material precursor to a CMAS-reactive material infiltrated selectively in the top part of the pores of the TBC.

Figure 5:
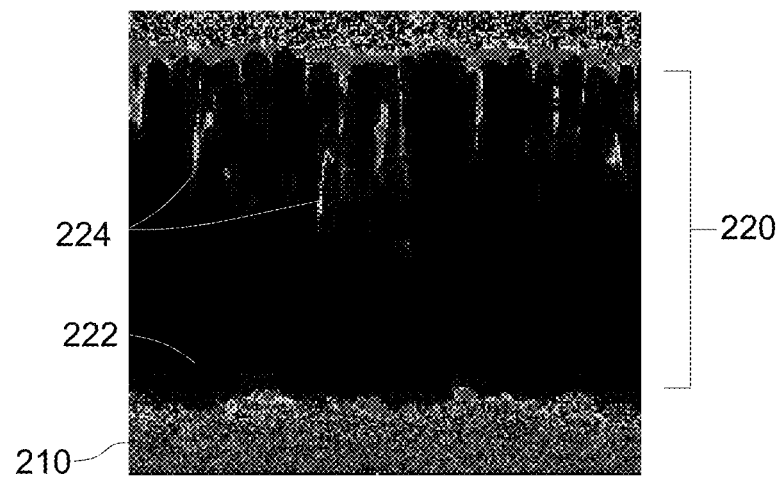
FIG. 5 represents a schematic WDS map of weight percentage of aluminum infiltrated into a thermal barrier coating using PEG-4000 as a fugitive material, in accordance with some embodiments of the present disclosure.

FIG. 5 represents a schematic illustration of an WDS map of weight percentage of aluminum in the TBC 220 deposited on the metal substrate 210 by using the PEG-4000 as the fugitive material. A substantial amount of aluminum 224 is seen along the top part of the TBC 220 in between the thermal barrier material 222 and the bottom part of TBC 220, near the substrate 210 is completely free of aluminum 224. The aluminum deposition is observed in less than 70% of height (thickness) of the TBC 220, near the surface.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A method of forming an article, comprising:
disposing a fugitive material within at least some surface-connected columnar voids in a thermal barrier coating disposed on a substrate, wherein disposing the fugitive material comprises infiltrating the at least some surface-connected columnar voids with a first liquid; and
disposing a calcium-magnesium-aluminum-silicon-oxide (CMAS)-reactive material within the at least some surface-connected columnar voids, such that the CMAS-reactive material is physically separated from the substrate by a columnar cavity having an aspect ratio greater than 3, wherein disposing the CMAS-reactive material comprises infiltrating the at least some surface-connected columnar voids with a second liquid, wherein the first liquid is at least partially immiscible with the second liquid.

2. The method of claim 1, wherein the fugitive material comprises mineral oil, polyethylene glycol, paraffin wax, or combinations thereof.

3. The method of claim 1, wherein the first liquid comprises a melt of the fugitive material, the fugitive material suspended in a carrier fluid, the fugitive material dissolved in a solvent, or combinations thereof.

4. The method of claim 3, further comprising drying at least a part of the first liquid, retaining the fugitive material.

5. The method of claim 1, wherein the second liquid comprises a precursor of the CMAS-reactive material.

6. The method of claim 5, further comprising drying at least a part of the second liquid, retaining the precursor of the CMAS-reactive material.

7. The method of claim 5, further comprising heat-treating to remove the fugitive material, to react the precursor to form the CMAS-reactive material, or a combination thereof.

8. A method, comprising:
disposing a fugitive material within at least some surface-connected columnar voids in a thermal barrier coating, wherein disposing the fugitive material comprises infiltrating the at least some surface-connected columnar voids with a first liquid;

disposing a calcium-magnesium-aluminum-silicon-oxide (CMAS)-reactive material over the fugitive material, wherein disposing the CMAS-reactive material comprises infiltrating the at least some surface-connected columnar voids with a second liquid, wherein the first liquid is at least partially immiscible with the second liquid; and removing the fugitive material to create a columnar cavity in the thermal barrier coating in between the CMAS-reactive material and the substrate.

9. The method of claim 8, wherein an aspect ratio of the at least some surface-connected columnar voids is greater than 3.

10. The method of claim 8, wherein the first liquid comprises a melt of the fugitive material, the fugitive material suspended in a carrier fluid, the fugitive material dissolved in a solvent, or combinations thereof.

11. The method of claim 8, wherein the second liquid comprises a precursor of the CMAS-reactive material.

12. The method of claim 11, further comprising: reacting the precursor to form the CMAS-reactive material.

* * * * *